United States Patent [19]

Matsumoto

[11] Patent Number: 5,710,637
[45] Date of Patent: Jan. 20, 1998

[54] CARD ISSUING MACHINE AND A METHOD FOR CONTROLLING THE SAME

[75] Inventor: Takeshi Matsumoto, Sagamihara, Japan

[73] Assignee: International Business Machines Corporation, Armonk, N.Y.

[21] Appl. No.: 515,884

[22] Filed: Aug. 16, 1995

[30] Foreign Application Priority Data

Oct. 20, 1994 [JP] Japan .................................. 6-255310

[51] Int. Cl.$^6$ .................................................. H04N 1/00
[52] U.S. Cl. .......................... 358/400; 358/474; 235/379; 235/380
[58] Field of Search ........................ 358/400, 401, 358/468, 474; 235/379, 380, 381

[56] References Cited

U.S. PATENT DOCUMENTS

4,026,642  5/1977  Tanaka et al. ............................. 355/1

*Primary Examiner*—Thomas D. Lee
*Attorney, Agent, or Firm*—John D. Flynn

[57] ABSTRACT

The disclosed invention reduces the possibility that an applicant who uses an unattended card issuing machine can change the contents of an application, intentionally or through error. Since the scanner device of an unattended card issuing machine also performs the image transmission function and a facsimile device is not necessary, there is a savings in the required space. Also, there is only one location where a document is positioned, whether an identification document or an application document, thus the operation will not confuse an applicant. The scanner device is so designed that it completely encloses and retains an inserted document, so that there are no problems when an application form is scanned and its image data are prepared. Thus, the possibility that the contents of an application may be changed intentionally or through error is substantially eliminated. According to another feature of the present invention, a shutter, which is freely opened and closed, is located along the paper feed route. When an identification document, such as a driver's license, is positioned on the scanner device, this shutter is closed and prevents that document from erroneously being carried in.

24 Claims, 5 Drawing Sheets

CARD ISSUING MACHINE AND A METHOD FOR CONTROLLING THE SAME

FIELD OF THE INVENTION

The present invention relates to an apparatus for preparing applications for cards and for issuing such cards, and a method for controlling such an apparatus.

Description of the Background

Conventionally, to be issued cards, such as membership cards or credit cards, applicants must complete application forms by entering their addresses, their names, their bank account numbers, their passwords, etc., and must mail the completed application forms to the companies that will issue the cards. In turn, the companies that will issue the cards determine the credit ratings of the applicants by referring to and verifying the information that is entered on the application forms, and then prepare and mail the cards to the applicants. Since applications and cards are sent by mail, it requires one to two weeks for cards to be issued. Then, when there are erroneous entries on application forms, there is usually an additional one to two week period required, so that the desires of those applicants who want to use their cards without delay are not satisfied.

Therefore, unattended card issuing machines, such as the one that is described in Japanese Unexamined Patent Publication No. Hei 5-233087, have recently begun to be used. To obtain a card by using such a device, an applicant communicates with a control center via an unattended card issuing machine. Then, when the credit rating of the applicant has been verified, the unattended card issuing machine produces a card, so that the applicant can obtain the card without delay.

With another proposed unattended card issuing machine arrangement, image data and a facsimile are used together to perform simple, high speed procedures for the issuing of credit cards. This machine includes an image scanner device and a facsimile device. To initiate an inquiry into the credit rating of an applicant, the machine prompts the applicant to position on the image scanner some identification document, such as a driver's license, a passport, or a heath insurance certificate. When the applicant complies with that instruction, the machine employs the image scanner to read the identification document and transmits the image data to a control center via a communication line.

By referring to the image data, the control center queries various financial status investigation organs, such as credit bureaus, to determine the credit rating of the applicant. When it is determined that an applicant's credit rating is satisfactory and that a credit card may be issued, a clerk transmits "credit satisfactory" to the terminal at which the application was submitted.

In response to this, the terminal prompts the applicant to complete an application form by entering requested data so that it may be transmitted by facsimile. Following this, after the applicant entered the requested data on the application form, the form is transmitted by the facsimile device. When the facsimile image of the filled-in application has been received at the control center, the clerk examines the image to determine whether any entries are missing.

When it has been verified that there are no missing entries, a signal indicating that there is no problem with the application form is transmitted to the terminal. The terminal prompts the applicant to insert the application form, of which a facsimile copy has been sent to the control center, into a specified orifice in order that the contract may be completed.

When the application has been inserted, the contract is completed, a card is issued immediately, and a copy of the application is output for the applicant's record. The applicant's completed original application is stored in a predetermined area, while the applicant receives the card that is issued and the copy of the application.

Since such a machine has two orifices, for the scanner device and for the facsimile device where the application document is inserted, a user who is not familiar with the operation of a terminal may become confused as to the orifice into which a document must be inserted.

Further, during the period from the time the image of an application is transmitted via the facsimile device to the control center until a contract is finally completed, the application on which data are entered is still retained by an applicant. Within that period of time, the applicant might alter the application intentionally or through error. The data image of the application that the clerk at the control center has examined would not then match the contents of the application, and the contents of the application may not be true.

In addition, since the facsimile device and the scanner device are independently provided and require their own operational areas, the card issuing machine becomes large, the item count is increased, and the manufacturing costs are raised.

SUMMARY OF THE INVENTION

It is therefore one object of the present invention to provide a document verification apparatus that requires comparatively small space and to provide a method for operating such an apparatus.

It is another object of the present invention to reduce the possibility that an applicant who uses a card issuing machine can change the contents of an application, intentionally or through error.

It is an additional object of the present invention to provide a mechanism for a scanner device in a card issuing machine that can adjust the size of the opening for the scanner device in consonance with the size of a document that is to be processed.

The above objects are achieved by providing a scanner device that has an image transmission function and also by providing a sheet feed mechanism in the scanner device.

More specifically, since the scanner device also performs the image transmission function and a facsimile device is not necessary, there is a saving in the required space. Also, as the location where a document is positioned is one that is only used for identification documents and for the issuing of cards, the operation will not confuse an applicant.

The scanner device is so designed that it completely encloses and retains an inserted document, so that there are no problems when an application form is scanned and its image data are prepared. Thus, the possibility that the contents of an application may be changed intentionally or through error is substantially eliminated.

Since the scanner device is so designed that it draws in and completely encloses a document, an important document for identification of an applicant that requires special, careful handling, such as a driver's license, a passport, or a health insurance certificate, may be erroneously drawn in via the insertion port for an application.

According to the feature of the present invention, therefore, a shutter, which is preferably electromagnetically driven, is located along the paper feed route. When an identification document is positioned on the scanner device, this shutter is closed and prevents that document from erroneously being carried in further.

When an application form is positioned on the scanner device, the shutter is opened and the application is carried in while it is being scanned by a means such as a roller. In response to the application having been carried in beyond a specific position, an image of the scanned application is transmitted to a control center.

According to a preferred embodiment of the present invention, a freely opened and closed lid is provided in the scanner device. This lid covers a document to keep it from being seen by people in the surrounding vicinity. When this lid is opened while the document is being drawn in, the movement of the document is halted. Thus, when an applicant notices a missing entry in his application, such an arrangement permits the applicant to open the lid, extract and correct the application, and then reposition the document on the facsimile and scanner device.

DESCRIPTION OF THE PREFERRED EMBODIMENTS

A. External Appearance of an Apparatus of the Present Invention

Figure 1:
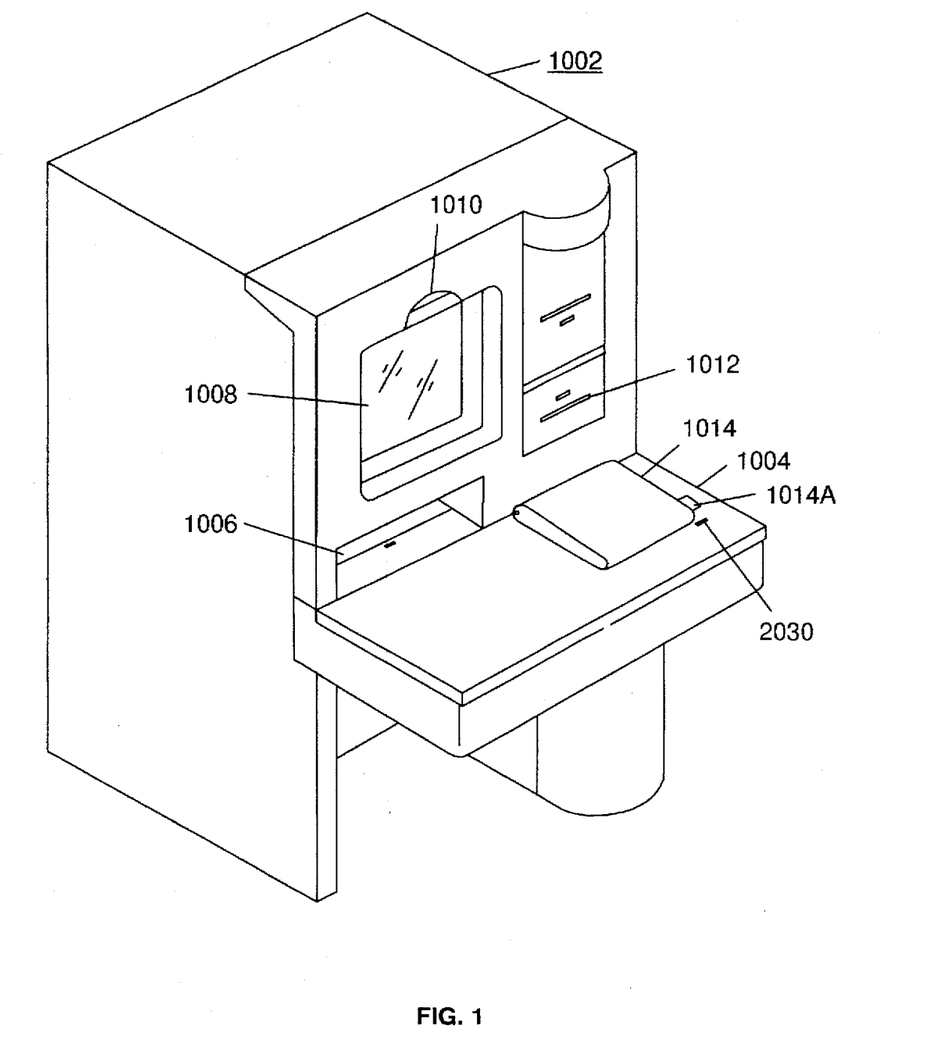
FIG. 1 is a perspective view depicting the external configuration of a credit card issuing machine according to the present invention.

FIG. 1 depicts the external configuration of a card issuing machine 1002 according to the present invention. At the front of the apparatus 1002 is provided a horizontal work table 1004, on which an applicant fills in a card application form and inserts the completed application into a scanner. Additionally, at the front of the apparatus 1002 are located an opening 1006, through which a blank application form that is printed by an incorporated laser beam printer is output; a touch display 1008, on which messages are displayed for an applicant and which the applicant touches with a finger at predetermined points to enter data; a camera 1010, by which a clerk at a remote center can view the applicant; a loudspeaker (not shown), for reproducing remarks made by a clerk at the remote center; and a microphone (not shown) for accumulating and transmitting remarks made by the applicant to the clerk at the remote center. A video image of the clerk at the remote center is displayed on the touch display 1008, as needed, so that the touch display 1008, the camera 1010, the microphone and the loudspeaker constitute a telecommunication system by which the clerk at the remote center and the applicant can communicate with each other using a screen and speech.

An opening 1012 is also provided at the front of the apparatus 1002 to output a card that is prepared by the apparatus 1002. A lid 1014 that is opened upward by pulling up a knob 1014a is provided at the right on the flat work table 1004. A scanner 3010 (see FIG. 3) is located under the lid 1014, an identification document, such as a driver's license, a passport, or a health insurance certificate, an application form and other documents, which are positioned under the lid 1014, are read by the scanner 3010, and those image data are transmitted via a communication line to the remote center. A lid sensor 2030 to detect the open and closed state of the lid 1014 is located near the lid 1014. The detailed structure of the lid 1014 and the scanner 3010 will be explained later while referring to FIG. 3.

B. Arrangement of a Control Unit

Figure 2:
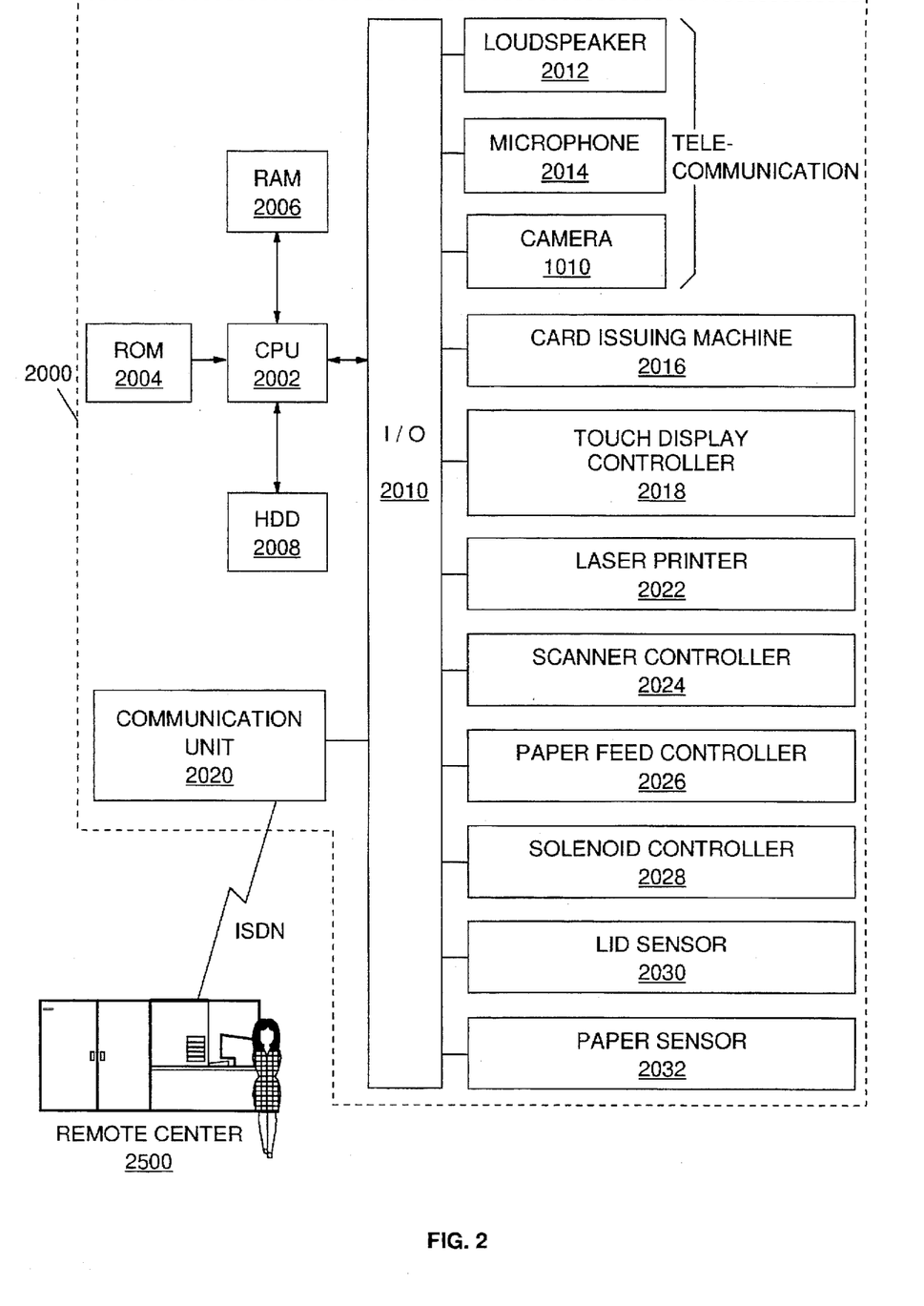
FIG. 2 is a block diagram for a control unit of a credit card issuing machine according to the present invention.

FIG. 2 is a block diagram for an electronic control unit in the apparatus 1002 in FIG. 1. In FIG. 2, reference number 2000 denotes a control unit of the apparatus 1002 and reference number 2500 denotes a remote center. In the control unit 2000, a CPU 2002 is an ordinary microprocessor that executes computation and input/output control, a ROM 2004 is a read only memory that includes an initial program loader, a RAM 2006 is a random access memory that provides a work area for the computations performed by the CPU 2002 and a program loading area, and an HDD 2008 is a hard disk on which are stored an operating system, a control program according to the present invention, and a control program for communication with a remote center 2500. On the HDD 2008 are also stored a file for an animated image that is displayed on the touch display 1008 during a waiting time, and a speech synthesis program to prepare a synthesized speech that is output by a loudspeaker, as needed, and a file that comprises an audio output messages.

The CPU 2002 is connected via an I/O port 2010 that has separate connection cards to a loudspeaker 2012, a microphone 2014, the camera 1010, a card issuing machine 2016, a touch display controller 2018, a laser beam printer 2022, a scanner controller 2024, a paper feed control mechanism 2026, a solenoid control mechanism 2028 that opens and closes a shutter 3006, which will be described later, the lid sensor 2030 that detects the opening and closing of the lid 1014, and a paper sensor 2032 that detects the insertion of an application.

The control unit 2000 of the apparatus 1002 further includes a communication unit 2020, which connects the apparatus 1002 via a communication line, such as an ISDN, to the remote center 2500 in a card issuing company.

C. A Scanner, a Shutter, and a Paper Feed Mechanism

Figure 3:
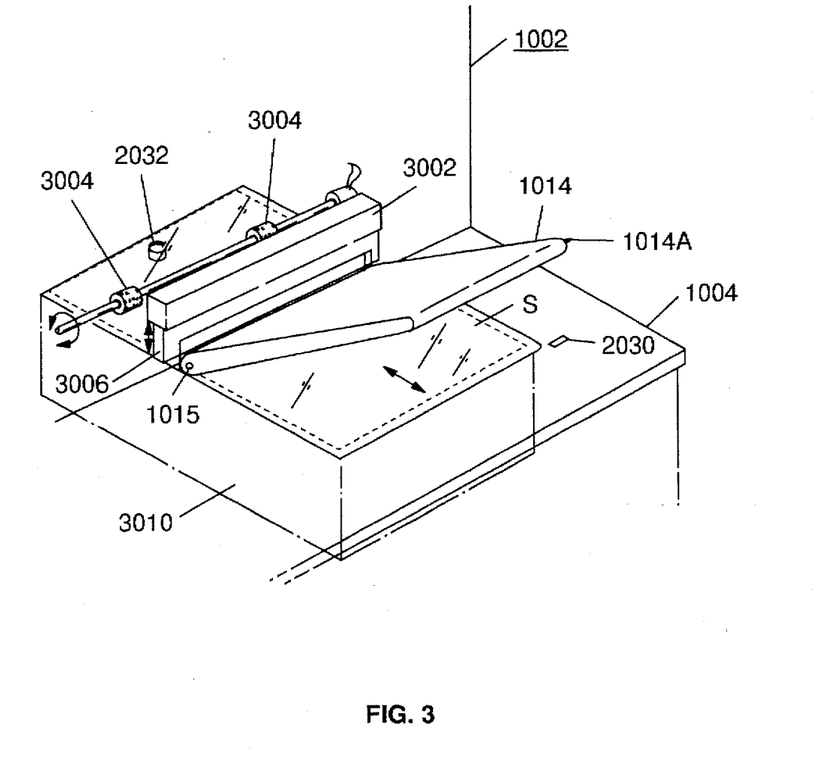
FIG. 3 is a diagram showing the structures of a scanner and a shutter of a credit card issuing machine according to the present invention.

The scanner 3010, the shutter 3006, and the paper feed mechanism of the apparatus 1002 will now be explained while referring to FIG. 3. As is shown in FIG. 3, the lid 1014 is attached rotatably by a shaft 1015, and either slightly clears the scanner 3010 or is formed of a soft material that has a small friction coefficient. Therefore, although the lid 1014 is usually positioned by its own weight so that it covers the scanner 3010, a document can pass through between the lid 1014 and the scanner 3010. The lid sensor 2030 that detects the open state of the lid 1014 is provided relative to the lid 1014. The lid sensor 2030 is a photosensor, and is connected to the I/O port 2010 so that the CPU 2002 can be electrically apprised of the detection result. The lid sensor 2030 may be designed with a mechanical detection means, such as a microswitch.

The scanner 3010 is located inside the table 1004, under the lid 1014. The scanner 3010 has a common arrangement in that it employs a light beam to scan an object that is placed on the table 1004 under the lid 1014, and detects the reflected light to form images. The top surface of the scanner 3010 is formed of a clear glass that lies in the same plane as the surface of the table 1004. The shutter 3006, which is driven upward and downward by a solenoid 3002, is located at the rear of the lid 1014 and inside the apparatus. Preferably, the scanning area to the right (to the front) of the shutter 3006 in FIG. 3 is almost as large as a passport that is opened flat. When the shutter 3006 is closed, it serves as a guide member for the positioning of an identification document, such as a driver's license or a passport.

To the rear of the shutter 3006 in the paper feed direction are provided rollers 3004, which are driven by a motor, that contact the top surface of a document S and employ friction to feed the document S to the left in FIG. 3. The shutter 3006, when it is in its low position, closely contacts the scanner 3010 to prevent documents from being shifted toward the rollers 3004. A paper sensor 2032 that detects the presence of a document is provided near the rollers 3004. The paper sensor 2032 is employed to detect documents that are positioned to the rear (FIG. 3) of the shutter 3006. When an application is inserted so that it overlies the paper sensor 2032 that is a photosensor, a light beam that usually impinges on the paper sensor 2032 is blocked. A storage box (not shown), which is physically secure and is normally locked, is provided upstream of the rollers 3004 in the paper feed direction. An application form that is driven by the rollers 3004 is stored in the storage box so that a card applicant cannot have access to it. Stored applications are collected by a clerk at the remote center 2500 who makes periodical visits, and are finally kept in a safe at the remote center 2500.

D. Card Issuing Process

A card issuing process in which the apparatus 1002 in FIG. 1 is employed will now be explained while referring to the flowcharts in FIGS. 4 and 5. A card in this case is the one that is issued for an individual who belongs to a certain group (e.g., a member's club), or who satisfies specific qualifications or requirements to obtain permission to avail himself of the services offered by a firm (e.g., a monetary facility).

Figure 4:
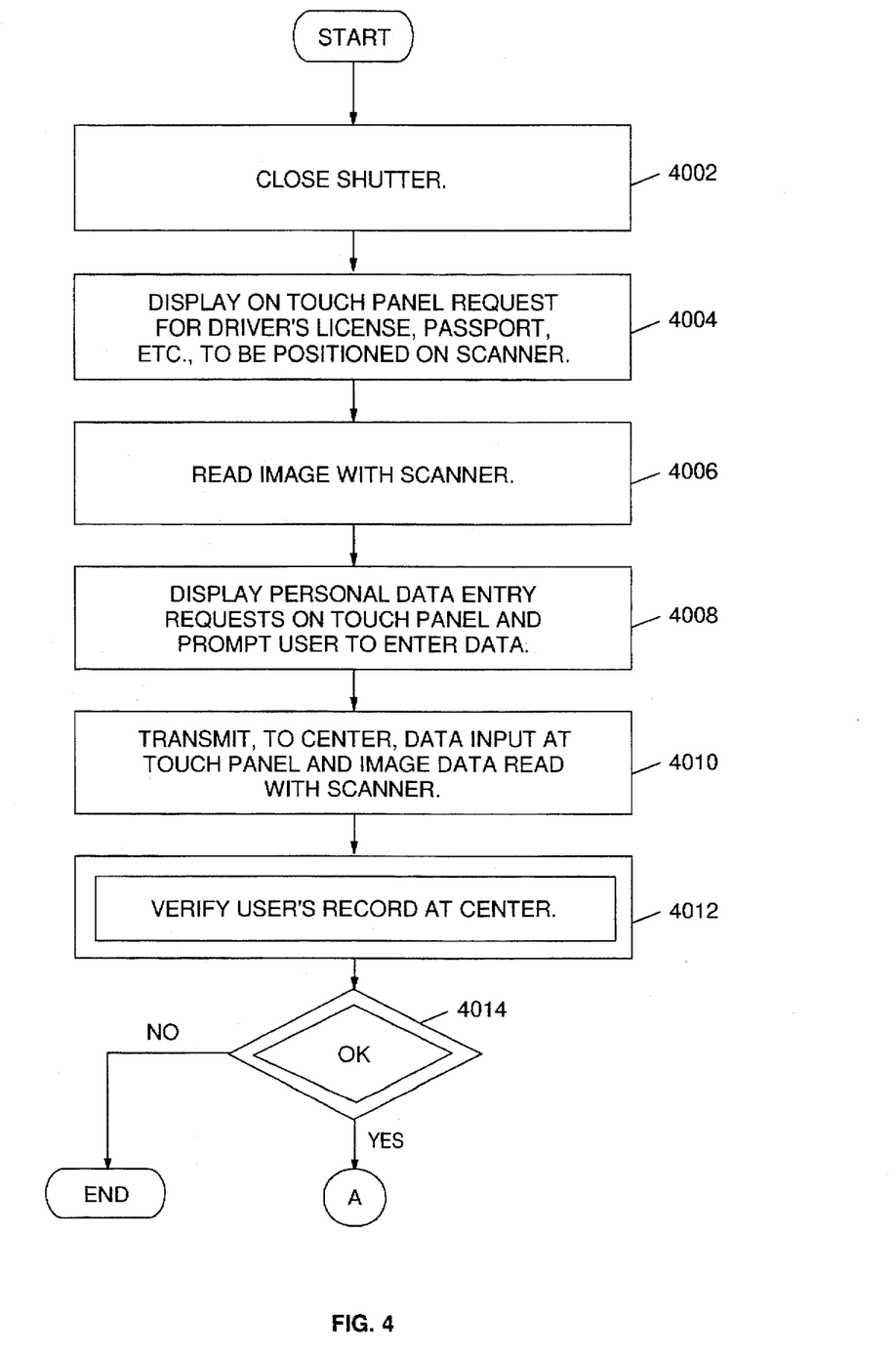
FIG. 4 is a flowchart for a credit card issuing process.
Figure 5:
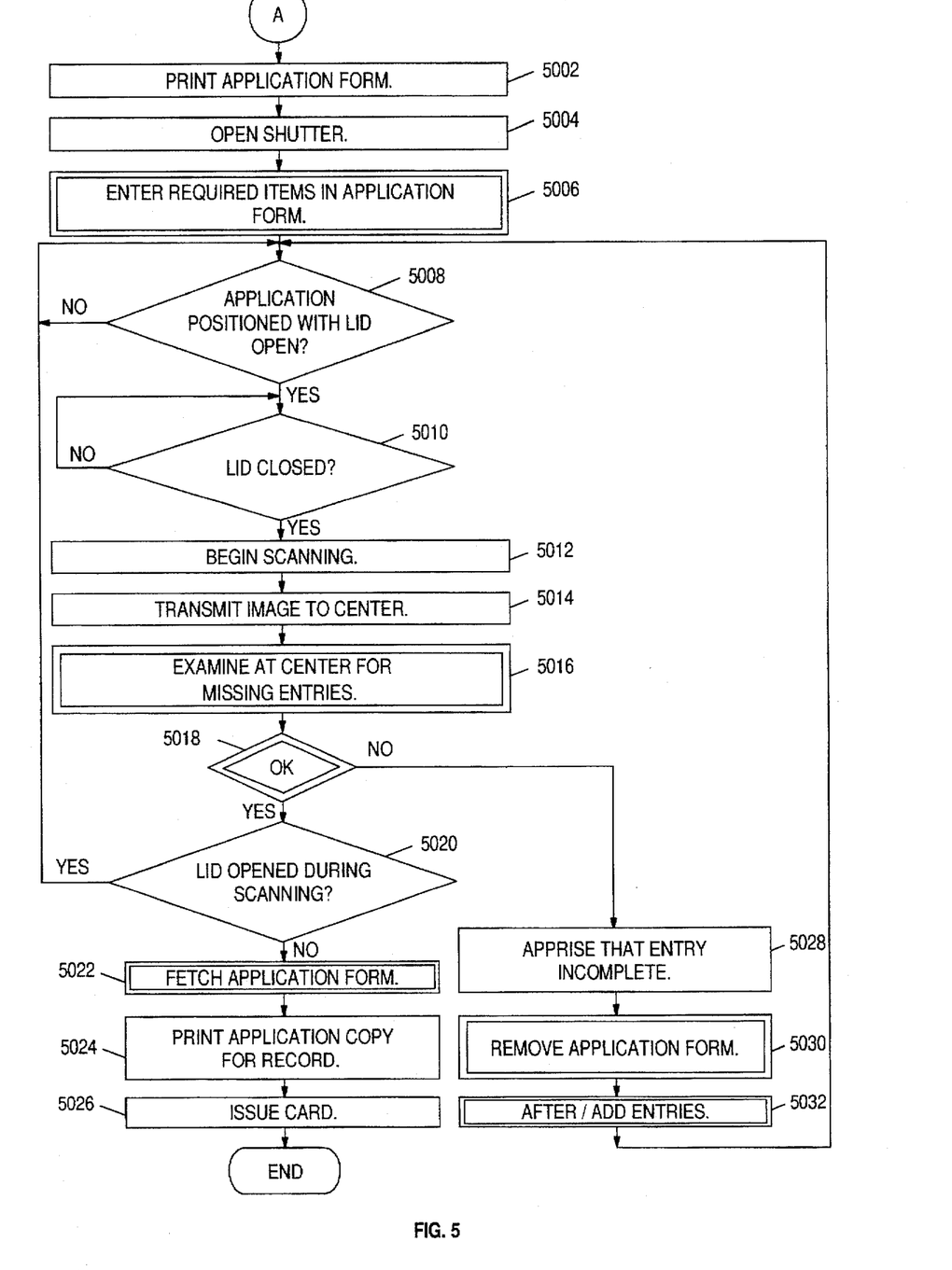
FIG. 5 is a flowchart for a credit card issuing process.

In the flowcharts in FIGS. 4 and 5, procedures in blocks enclosed by double solid lines are not performed by a computer, but are manual procedures that are performed by a clerk at the remote center 2500, or an applicant at the apparatus 1002, i.e., an applicant who is applying for a card. The process in FIG. 4 is began when, for example, an applicant touches with a finger a button "Start operation" (not shown), which is displayed on the touch display 1008. Then, at step 4002, the CPU 2002 controls the solenoid control mechanism 2028 to shift the shutter 3006 to its low position.

At step 4004, the display controller 2018, under the control of the CPU 2002, displays a message on the touch display 1008 requesting an identification document, such as a driver's license, a passport, or a health insurance certificate, be positioned on the scanner 3010, i.e., under the lid 1014. Data from which the message is derived are stored on, for example, the HDD 2008, and are called up by the CPU 2002 as needed.

In consonance with this message, the applicant raises the lid 1014 with the knob 1014a, and places his identification document, such as a driver's license, a passport, or a health insurance certificate, on the clear glass of the scanner 3010 (FIG. 3). Since the shutter 3006 is closed, one side of the identification document abuts upon the shutter 3006 which serves as a positioning guide. The shutter 3006 serves also as a guard means to prevent the identification document, which is placed on the scanner 3010, from being drawn in by the rollers 3004 and not thus not be able to be extracted from the apparatus 1002.

Then, the applicant closes the lid 1014 and touches a "Confirmed" button (not shown) that is displayed on the touch display 1008. The CPU 2002 activates the scanner 3010 via the scanner controller 2024. An image of the identification document that is positioned on the clear glass is read by the scanner 3010 and the image data are stored in the RAM 2006. Then, a message indicating that the identification document may be removed from under the lid 1014 is displayed on the touch display 1008.

At step 4008, the display controller 2018, which is controlled by the CPU 2002, sequentially displays on the touch display 1008 various data requests, such as name, age, sex, home telephone number, office telephone number, and birth date. The applicant selects one of a plurality of displayed items to respond to some data requests, or enters characters by touching the keys of a pseudo keyboard displayed on the touch display 1008 for other data requests.

After the applicant responds to the displayed data requests, a screen on which are displayed the data that were entered and a request for confirmation appears on the touch display 1008. When the applicant touches the "Confirmed" button (not shown), which is displayed on the touch display 1008, the image data of the previously scanned identification document and data entered for the information requests are transmitted via a communication line to the center 2500 (step 4010).

At step 4012, by referring to the image data of the identification document and data items that were entered, which are transmitted at step 4010, a clerk at the center 2500 determines the credit rating of an applicant. Since it takes a little time to investigate the credit rating of the applicant, it may be preferable for the CPU 2002 to read animated images from the HDD 2008 and to display them on the touch display 1008 so that the applicant will not be too bored while he is waiting. During the investigation, the clerk at the center 2500 can confirm the identity of the applicant by comparing the image data of the picture of the applicant attached to the identification document with the image acquired by the camera 1010.

As the result of queries to determine the applicant's credit rating at step 4012, at step 4014, the clerk at the center 2500 transmits a message to the apparatus 1002 via the communication line.

If the result is "Not acceptable," the process is terminated, and preferably, a message indicating that the procedure can not be continued is displayed on the touch display 1008.

If, at step 4014, the response to the apparatus 1002 is "Acceptable," program control goes to the process shown in FIG. 5.

When program control advances to the process shown FIG. 5, this means that the applicant has a satisfactory credit rating and can be issued a card. At step 5002, the CPU 2002 calls up a predetermined format file that is stored on the HDD 2008, and prints it by using the laser printer 2022. An application that is thus printed is discharged from the opening 1006 in FIG. 1. At step 5004, the solenoid control mechanism 2028, which is controlled by the CPU 2002, shifts the shutter 3006 to the high position. Though now shown, at step 5004, a message indicating that necessary items on the printed application form are to be completed is displayed on the touch display 1008. It is preferable that a screen also be displayed that can serve as an example for completing an application.

At step 5006, the applicant enters requested items into the application on the table 1004. The requested items include the applicant's signature, and his name and address.

After the applicant has completed the application, he lifts the lid 1014 and positions the completed application (indicated by S in FIG. 3) on the scanner 3010, so that it passes under the shutter 3006, which is opened, through the rollers 3004 and reaches the position above the paper sensor 2032. At this time, the lid sensor 2030, for the lid 1014, determines that the lid 1014 was opened temporarily, and the paper sensor 2032 determines that the application is located at a predetermined position on the scanner 3010. Therefore, the decision at step 5008 is determined to be affirmative, and program control moves to decision step 5010.

When the decision at step 5010 is affirmative, i.e., when the lid sensor 2030 determines that the lid 1014 is closed after the application has been positioned on the scanner 3010, at step 5012, a scanning process is performed by the CPU 2002. It should be noted that this scanning is not performed by shifting the application, but by shifting a light beam along the surface of the application during the irradiation of the application. The image of the application S is read and the resultant image data are stored in the RAM 2006.

At step 5014, the image data that are read and stored in the RAM 2006 are sent via the communication line to the center 2500.

Upon the receipt of the image data, at step 5016, a clerk at the center 2500 examines the transmitted application image for missing entries. At step 5018, the clerk determines whether or not the entries in the application are correctly completed. When, at step 5018, there are no missing entries, program control advances to step 5020. Substantially, the center 2500 transmits to the apparatus 1002, via the communication line, a signal verifying that all the entries entered in the application have been correctly completed.

At step 5020, the control unit 2000 of the apparatus 1002 determines whether or not the lid 1014 was opened during the scanning at step 5012. This decision is made by monitoring the state of the lid sensor 2030 during the scanning, and by setting a flag at a predetermined address in the RAM 2006 when a change in the state is detected.

When the control unit 2000 of the apparatus 1002 determines that the lid 1014 was opened during the scanning at step 5012, program control is forced to return to step 5008, and the image of the application that was transmitted to the center 2500 is invalidated. The fact that the lid 1014 is opened during the scanning introduces the possibility that an applicant intentionally changed the original application that is being scanned. Of course, when the applicant opens the lid 1014 during the scanning, it may be because he noticed incorrect entries on the application during the scanning and forced the process to return to step 5008 so that he could correct it.

In such a case, when program control returns to step 5008, the applicant has to open the lid 1014 and remove the application. Since the sensor 2032 detects the absence of paper, the decision at step 5008 is not affirmative and program control remains at step 5008.

When the applicant reopens the lid 1014 and repositions the application, the decision at step 5008 is affirmative. Then, when the lid 1014 is closed, the decision at step 5010 is affirmative, and the scanning is resumed at step 5012.

If, at step 5020, the control unit 2000 of the apparatus 1002 decides that the lid 1014 was not opened during the process, the apparatus 1002 sends a signal to that effect to the center 2500 via the communication line.

Upon the receipt of the signal, a clerk at the center 2500 performs the operation instruction "Fetching the application." A predetermined signal is then transmitted via the communication line to the control unit 2000 of the apparatus 1002. In response to this signal, the control unit 2000 rotates the rollers 3004 in FIG. 3 clockwise (FIG. 3), so that the application is advanced by the rollers 3004 and is stored in a physically secure storage box.

At step 5024, a copy of the application is printed. Substantially, the scanned image of the application that is stored in the RAM 2006 is printed by a laser beam printer 2022 and discharged from the opening 1006.

At step 5026, a card is output from the opening 1012. In this embodiment, the card issuing machine 2016 merely holds a plurality of cards, on the surface of each specific numbers are embossed, and outputs them one by one from the opening 1012. The issued card, and the personal data that are input at step 4008, or the image data of the application read at step 5012 are entered with correspondence to a host computer (not shown) at the center 2500. The applicant takes the issued card and the printed copy of the application.

When, at step 5018, a clerk at the center 2500 decides that the entries of the application are incomplete, a signal to that effect is transmitted to the control unit 2000 of the apparatus 1002, and a message indicating "Entries incomplete" is displayed on the touch display 1008.

In response to this, at step 5030, the applicant removes the application from under the lid 1014. At step 5032, the applicant makes the requested changes or additions to the application. The procedures at step 5008 and the following steps are repeated.

As described above, according to the present invention, since the scanner device has the image transmission function and a facsimile device is not necessary, there is a savings in the space that is required. Also, as the position where a document is positioned is only used for identity references and for the issuing of a card, the operation will not cause an applicant to become confused.

The scanner device is so designed that a document is pulled in when an application format is scanned and image data for it are prepared. Thus, the possibility that the contents of an application will be changed intentionally or changed by error is effectively eliminated.

Since a shutter that is freely opened and closed is located in association with the feed path of the scanner device, when the shutter is closed and an identification document, such as a driver's license, a passport, or a health insurance certificate, is to be scanned, the positioning of such a document is easy, and the possibility that the scanner may erroneously pull the document in is reduced. The operation and safety of the terminal device, therefore, are greatly improved.

I claim:

1. A card issuing machine comprising:
   (a) scanner means for scanning a document and preparing image data for said document;
   (b) means for passing said document through said scanner means and transferring said document to a storage position;
   (c) shutter means, which is located between said scanner means and said storage position and which is freely shifted between a first position that blocks the transfer of said document from said scanner means and a second position that permits the transfer of said document from said scanner means to said storage position;

(d) means for enabling data transmission via a communication line to a remote center;

(e) means for driving said scanner means while said shutter means is moved to said first position, and transmitting, as data for reference, said data for reference in the form of image data that is read by said scanner means to said remote center via said communication line;

(f) means for, upon receipt of a notice from said remote center via said communication line that a financial state of an applicant is satisfactory according to said data for reference, for driving said scanner means while said shutter means is shifted to said second position, and for transmitting, as card application data, said card application data in the form of image data read by said scanner means to said remote center; and (g) means for, upon the receipt of a notice from said remote center via a communication line that the contents of said card application data are verified, transferring to said storage position a document that is placed on said scanner by said means for transferring said document, and for performing a card issuing process.

2. A card issuing machine according to claim 1, further comprising:

a lid, being freely opened and closed, for covering at least a part of said scanner means;

sensor means for detecting the open and the closed state of said lid; and means for, in response to the detection by said sensor means that said lid has been opened during scanning performed by said scanner means, controlling the transfer of said document by said means (g) and inhibiting said card issuing process.

3. A card issuing machine according to claim 1 or 2, wherein a document that is placed on said scanner means when said scanner means is driven by said means (e) is a driver's license, a passport, or a health insurance certificate, and a document that is placed on said scanner means when said scanner means is driven by said means (f) is a card application.

4. A card issuing machine according to claim 3, further comprising a printer and means for storing data to be printed by said printer, wherein said card application is printed by said printer.

5. A card issuing machine according to claim 4, wherein said printer is a laser beam printer.

6. A card issuing machine according to claim 2, further comprising sensor means for detecting that paper has been carried from said shutter means to said storage position, wherein said means (f) begins a process when said sensor means detects that said paper has been carried to said storage position and that said lid is closed.

7. A card issuing machine according to claim 1, further comprising:

a touch display;

means for displaying instructions and data entry requests required for said touch display; and means for transmitting data, which are input at said touch display, via said communication line.

8. A card issuing machine according to claim 7, further comprising:

a camera for monitoring an applicant at said card issuing machine; and means for transmitting a video image recorded by said camera via said communication line.

9. A card issuing machine according to claim 8, further comprising:

a microphone for acquiring oral remarks made by said applicant at said card issuing machine; and means for transmitting a voice signal acquired by said microphone via said communication line.

10. A card issuing machine according to claim 1, further comprising:

a touch display for displaying instructions and data entry requests and receiving input data in response to the data entry request; and wherein said input data is transmitted to the remote center via said communication line.

11. A card issuing machine according to claim 10, further comprising:

a camera for monitoring an applicant at said card issuing machine; and for transmitting a video image recorded by said camera via said communication line.

12. A card issuing machine according to claim 11, further comprising:

a microphone for acquiring oral remarks made by said applicant at said card issuing machine; and for transmitting a voice signal acquired by said microphone via said communication line.

13. A method for controlling by a computer process a card issuing machine, which includes scanner means for scanning a document and preparing image data; means for transferring said document through said scanner means to a storage position; shutter means that is located between said scanner means and said storage position and that is freely shifted between a first position for blocking the transfer of said document from said scanner means and a second position for permitting the transfer of said document from said scanner means to said storage position; and means for transmitting data via a communication line to a remote center, said method for controlling a card issuing machine comprising the steps of (a) driving said scanner means while said shutter means is shifted to said first position, and transmitting, to said remote center, via said communication line, as data for reference, said data for reference in the form of image data that are read by said scanner means;

(b) upon receipt, from said remote center via said communication line, of a notice that said data for reference are confirmed, driving said scanner means while said shutter means is shifted to said second position, and transmitting to said remote center, as card application data, said card application data in the form of image data that are read by said scanner means;

(c) upon receipt, from said remote center via said communication line, of a notice that said card application data are satisfactory, transferring said document placed on said scanner means by said means for transferring said document and performing a card issuing process.

14. A method for controlling a card issuing machine according to claim 13, wherein said card issuing machine further comprises a lid that is freely opened and closed to cover at least a part of said scanner means, said method further comprising the steps of:

detecting that said lid is opened during said scanning of said scanner means; and, upon receipt of the detection, controlling the transfer of said document at step (c) and inhibiting said card issuing process.

15. A method for controlling a card issuing machine according to claim 13 or 14, wherein said document that is placed on said scanner means when said scanner means is driven at said step (a) is a driver's license, a passport, or a health insurance certificate, and a document that is placed on said scanner means when said scanner means is driven at said step (b) is a card application.

16. A method for controlling a card issuing machine according to claim 15, further comprising a step of printing said card application with a printer.

17. A method for controlling a card issuing machine according to claim 16, wherein said printer is a laser beam printer.

18. A card issuing machine comprising:
   (a) a scanner for scanning a document and preparing image data for said document;
   (b) a paper feed mechanism for transferring said document through said scanner to a storage position;
   (c) a shutter located between said scanner and said storage position which is freely shifted between a first position that blocks the transfer of said document from said scanner and a second position that permits the transfer of said document from said scanner to said storage position;
   (d) a communications line providing data transmission to and from a remote center;
   (e) a control unit for driving said scanner while said shutter is moved to said first position, and transmitting via said communications line to said remote center said image data that is read by said scanner with an identification document positioned thereon; said control unit, upon receipt of a notice from said remote center via said communication line that a financial state of an applicant is satisfactory, driving said scanner while said shutter means is shifted to said second position, and for transmitting, as card application data, said image data read by said scanner from an application document placed thereon, to said remote center; and upon the receipt of a notice from said remote center via the communication line that the contents of said card application data are verified, transferring to said storage position the application document placed on said scanner by said paper feed mechanism, and causing a card to issue.

19. A card issuing machine according to claim 18, further comprising:
   a lid, being freely opened and closed, for covering at least a part of said scanner;
   a sensor for detecting the open and the closed state of said lid; and wherein the control unit in response to the detection by said sensor that said lid has been opened during scanning preventing the transfer of said application document by said paper path mechanism and inhibiting the issuance of said card.

20. A card issuing machine according to claim 18 or 19, wherein the identification document is a driver's license, a passport, or a health insurance certificate.

21. A card issuing machine according to claim 20, further comprising a printer and memory for storing data to be printed by said printer, wherein said application document is printed by said printer.

22. A card issuing machine according to claim 21, wherein said printer is a laser printer.

23. A card issuing machine according to claim 19, further comprising a paper sensor for detecting that paper has been carried from said shutter to said storage position, wherein said card issues only when said paper sensor detects that said application document has been carried to said storage position and that said lid is closed.

24. An article of manufacture for use in a card issuing machine connected to a remote center, the card issuing machine including a scanner, a paper feed mechanism, a shutter, a storage position, a communications line providing data transmission to and from a remote center, and a control unit, said article of manufacture comprising a computer useable medium having computer readable program embodied in said medium, wherein the computer readable program when executed on the card issuing machine causes the card issuing machine to:
   scan a first document and prepare image data for said first document while said shutter is shifted to a first position;
   transmit as a reference data the image data read by the scanner from the first document;
   receive a first notice indicating that the reference data is confirmed;
   scan a second document and prepare image data for the second document while the shutter means is shifted to a second position;
   transmit as card application data the image data read by the scanner from the second document;
   receive a second notice indicating that the card application data are satisfactory;
   transfer the second document to the storage position using the paper feed mechanism; and
   issue a card.

* * * * *